(12) United States Patent
Yuan

(10) Patent No.: US 9,389,830 B2
(45) Date of Patent: Jul. 12, 2016

(54) COMBINED MULTI-SOURCE INPUT INTERFACE

(71) Applicant: Arthur Tan-Chi Yuan, Chicago, IL (US)

(72) Inventor: Arthur Tan-Chi Yuan, Chicago, IL (US)

( * ) Notice: Subject to any disclaimer, the term of this patent is extended or adjusted under 35 U.S.C. 154(b) by 336 days.

(21) Appl. No.: 14/140,447

(22) Filed: Dec. 24, 2013

(65) Prior Publication Data

US 2015/0178043 A1    Jun. 25, 2015

(51) Int. Cl.
*G06F 3/16* (2006.01)
*G06F 3/0488* (2013.01)

(52) U.S. Cl.
CPC .............. *G06F 3/167* (2013.01); *G06F 3/0488* (2013.01); *G06F 2203/0381* (2013.01)

(58) Field of Classification Search
CPC ..................................................... G06F 3/0488
USPC .......................................................... 715/728
See application file for complete search history.

(56) References Cited

U.S. PATENT DOCUMENTS 6,167,376 A * 12/2000 Ditzik ..................... G06F 3/038
                                                      704/231
2015/0025876 A1 * 1/2015 Ghassabian ........... G06F 17/276
                                                      704/9

* cited by examiner

*Primary Examiner* — William Titcomb
(74) *Attorney, Agent, or Firm* — Arthur Tan-Chi Yuan

(57) ABSTRACT

Computerized method for composing actions from two or more input sources comprising. The method includes identifying content rendered on a content provisioning interface. The method further includes receiving a first input from a first input source on a part of the identified content. A second input from a second input source is also received to interact with the part of the identified content. The second input source is different from the first input source. The method also includes composing a combined action from the received second input from the second input source and the received first input from the first input source. The composed action is executed to interact with the part of the identified content.

20 Claims, 5 Drawing Sheets

COMBINED MULTI-SOURCE INPUT INTERFACE

BACKGROUND

User interfaces for computing device users have evolved over the last few years ever since touch-sensitive devices were introduced. Touch-sensitive devices make interactions between users and the devices easier. A simple swipe on screens of these devices may turn a page, delete an icon, delete an app, or scroll to the top of a page. At the same time, non-touch based input also continues to develop, such as voice commands or motion detection.

While these sources of inputs continue to develop individually, these devices fail to combine the input from these sources for one action or command as part of a user interface experience.

SUMMARY

Aspects of the invention overcome prior deficiencies by combining the different inputs from different interface sources into a complete action or a command for a user to interact with a device. The user no longer needs to choose one input over the other, or has to wait for one action to be completed/executed before initiating another. Embodiments of the invention enable the user to interact with a given device using a combination of either voice, touch, or GPS, touch motion, or even eye-movement to compose an actionable command.

In addition, a further embodiment of the invention incorporate the dynamic nature of different input sources to create endless combination of complete actions or commands. The combined action is one single or unitary action to generate rich user experiences with the computing device. The user no longer is tied to the "click" or "press" combination to obtain a predefined action for rich interactions with the computing device.

According to one embodiment of the invention, a system for combining sources of interface inputs to form an actionable command includes identifying content rendering on a user interface. A touch input on a part of the identified content is received. Another input from another source is received to interact with the part of the identified content. The another source is different from the touch input. A combined action is composed from the received second input and the received touch input. The method also includes executing the composed action to interact with the part of the identified content.

According to another embodiment of the invention, a method for combining sources of interface inputs to form an actionable command includes identifying content rendered on a content provisioning interface. A first input is received from a first input source on a part of the identified content. A second input is received from a second input source to interact with the part of the identified content. The second input source is different from the first input source. The method includes composing a combined action from the received second input from the second input source and the received first input from the first input source. The composed action is executed to interact with the part of the identified content.

According to a further embodiment of the invention, a system having tangible computer-readable medium with computer-executable instructions stored thereon for combining sources of interface inputs to form an actionable command includes a client device having a processing unit configured for processing computer-executable instructions, a content provisioning interface, a first user interface input source, a second user interface input source, a network interface, and a memory. The processing unit identifies a content rendered on the content provisioning interface. The first user interface input source receives a first input from a user on a part of the identified content. The second user interface input source receives a second input from the user to interact with the part of the identified content. The second user interface input source is different from the first user interface input source. A remote memory stores data associated with the first input and the second input via the network interface. The processing unit composes a combined action from the received second input from the second input source and the received first input from the first input source. The processing unit further executes the composed action for the user to interact with the part of the identified content.

BRIEF DESCRIPTION OF DRAWINGS

Corresponding reference characters indicate corresponding parts throughout the drawings.

DETAILED DESCRIPTION

Figure 1:
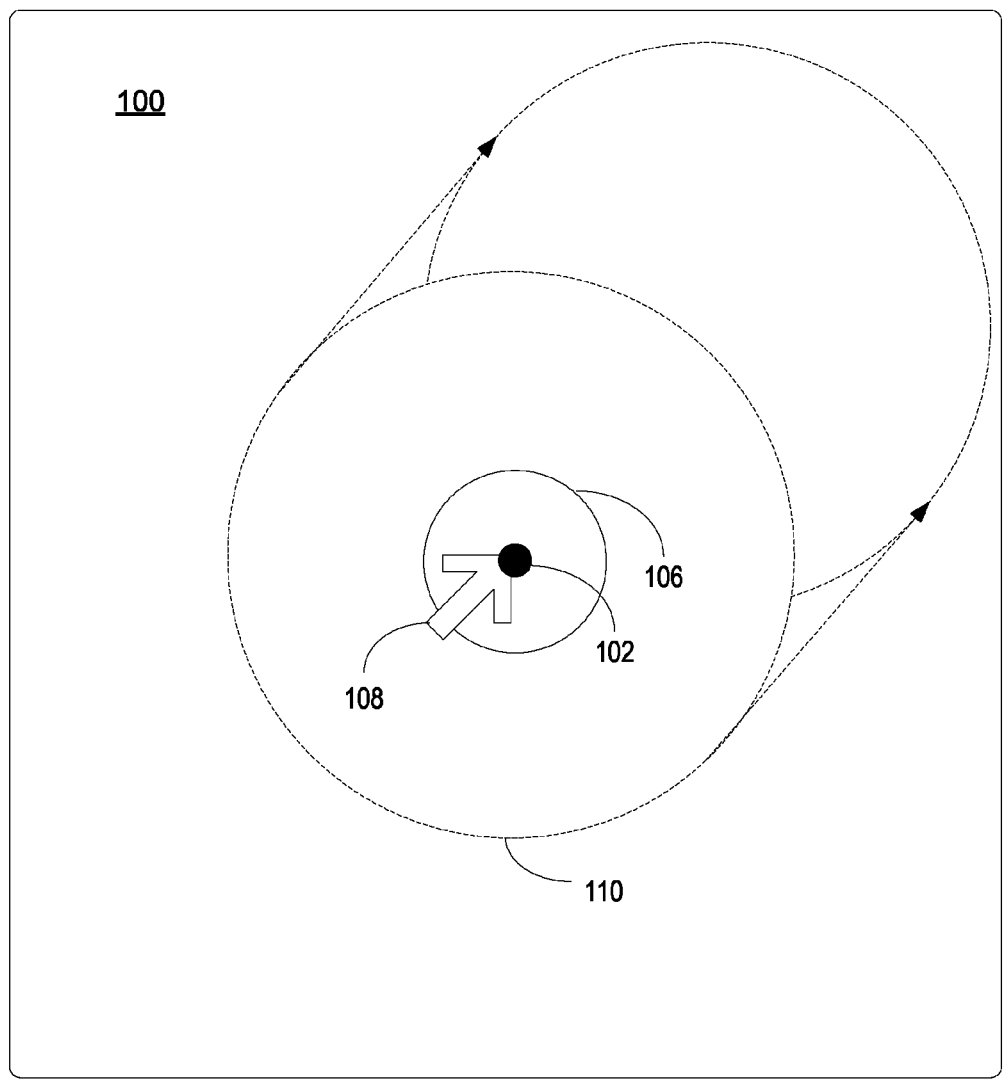
FIG. 1 is a diagram illustrating an environment for generation of a complete action from two or more user input sources according to one embodiment of the invention.
Figure 1:
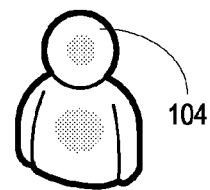

Referring now to FIG. 1, a diagram illustrates an environment for generation or composition of a complete action from two or more user input sources according to one embodiment of the invention. For the simplicity, FIG. 1 is described in conjunction with FIG. 2, which is a state diagram illustrating state transitions for generating of a complete action from two or more user input sources according to one embodiment of the invention. FIG. 1 shows a display 100 that renders or displays a content 102. In one example, the display 100 is a display for a computing device (not shown). The display 100 may also be other types of content provisioning interface, such as an audio output device. The computing device may be a computer, a mobile device, or the like. For illustration purposes and without limitation, the content 102 is a dot or a circle rendered or displayed on the display 100. It is to be understood that the content 102 may be a part (e.g., a word or a phrase) of a web page or a document or the complete web page or a document, a picture or a portion of a picture, a point on a map or locational referencing document, or a combination of the above.

Upon the display or rendering of the content 102, a user 104 is able to interact with the content 102 or a portion of the content 102. In this illustration, the user 104 is able to interact with the content 102 via a first input source, such as a touch 106 through the display, which is a touch-sensitive display in this example. At the same time, the user 104 is able to interact with the content 102 via a second input source, such as a cursor 108 via a point device, such as a mouse or a stylus. The interactions with the exemplary two input sources maybe nearly or substantially simultaneous or simultaneous. In one embodiment, the timing of the interactions may be timed such that if the second interaction is not received within a predetermined period (such as 1 second or 2 seconds), the computing device will generate the complete command based on the first input only. If the first input and the second input are received within the predetermined period, the computing device generates a combined command, instruction, or action of "zoom in" in a direction depicted as by action 110 based on a combination of the touch 106 and the cursor 108.

In one example, the combined command of "zoom-in" in the direction shown in FIG. 1 is in response to the two input sources described above. In other words, after the display 100 renders or displays the content 102 to the user 104, the computing device transitions to a first input waiting state 204 from an initial state 202 to receive a first input from the user 104 to interact with the content 102 or a part of the content 102. Upon receiving the first input, the computing device identifies data associated with the first input, such as a location on the display 100 where the first input is received. For example, the computing device receives the touch 106 and associates the underlying command or action of the touch 106, in this case, the command or action is "select" or "focus". The computing device further identifies the location of the touch 106. The computing device calculates the identified location in reference to the displayed or rendered content on the display 100. In this example, the touch 106 represents a command or a gesture of "select" or "focus". As such, the computing device initiates a formation of a potential command or action from the user 104 at compose a potential command state 206. In this example, the computing device starts building the command or action by obtaining the command or action represented by the touch 106, "SELECT or FOCUS" and providing an object to this command or action in accordance with the identified location on the content displayed or rendered on the display 100. As such, the command or action composed up to now may be: "SELECT object {content identified in association with the identified location}.

In one embodiment, the computing device may include a dedicated routine or programming that constantly monitors or tracks for touch inputs such as the touch 106, identifies the corresponding identified locations, and correlates to the content displayed or rendered on the display 100.

In one embodiment, the computing device transitions to a second input waiting state 208 waiting for a second command. As indicated, the computing device in the second input waiting state 208 is a timed state. In other words, if the second input is not received within a predetermined period, the computing device transitions into an input timed out state 210. The computing device next transitions to a state 212 that either compose a complete command based on the received first input or issues an exception or error. In another embodiment, the computing device may terminate or abort execution of the composed command without displaying the error after an execution timeout.

Figure 2:
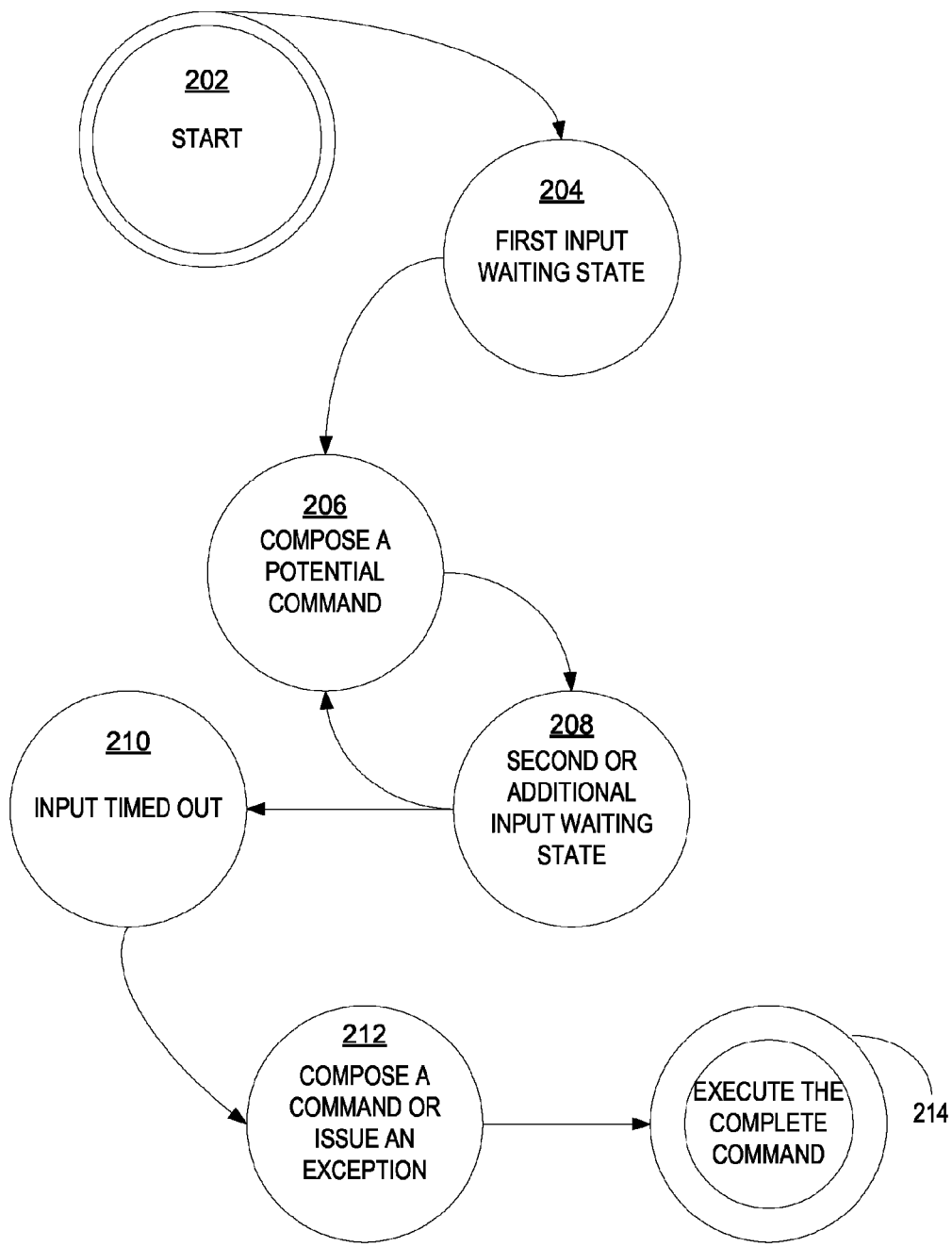
FIG. 2 is a state diagram illustrating state transitions for composing a complete action from two or more user input sources according to one embodiment of the invention.

Still referring to FIG. 1 and FIG. 2, the computing device receives a second input, the cursor 108, that also interacts with the content 102. In other words, the user 104 has also caused the cursor 108 to identify the content 102 while the first input, the touch 106, is also identifying the content 102. That is, when the cursor 108 moves to the location of the content 102 while the touch 106 is still identifying the content 102, the computing device has not timed out in the state 208. As such, the computing device transitions to the state 206 to compose a potential command that is a combination of the touch 106 and the cursor 108. For example, the command associated data with the cursor 108 identifying the location of the content 102 may be "zoom in." As such, the combination of the complete commands of the two input is interpreted as: SELECT object (content identified in association with the identified location) and ZOOM IN the RETURN OBJECT (from the SELECT command). In this example, the complete command is a conjunction. In another example, the complete command may be disjunctive between the two or more commands.

According to FIG. 2, the computing device transitions back to the state 208 to wait for further inputs. In an alternative embodiment, a third input may be provided via a movement of the cursor 108. As such, the computing device transitions to the state 206 to compose a potential command based on a combination of the three commands. In this example, the potential command based on the three inputs above may be: SELECT object (content identified in association with the identified location) and ZOOM IN the RETURN OBJECT (from the SELECT command) in the direction in accordance with the movement of the ZOOM IN input.

In a further embodiment, the computing device may concatenate commands from the command associated with the different inputs as the number of input increases. As such, the composed commands become a dynamic set of actionable commands. The composed commands permit various permutations of commands based on the input available to the user. The data associated with the input from the input sources may include parameter information, such as location, time, geographic coordinates, three-dimensional spatial information, pitch, tone, or gesture.

Once the computing device transitions to the input timed out state 210 and then the composition of the command or the exception issuing state 212, the computing device ends with executing the command state 214.

Figure 3:
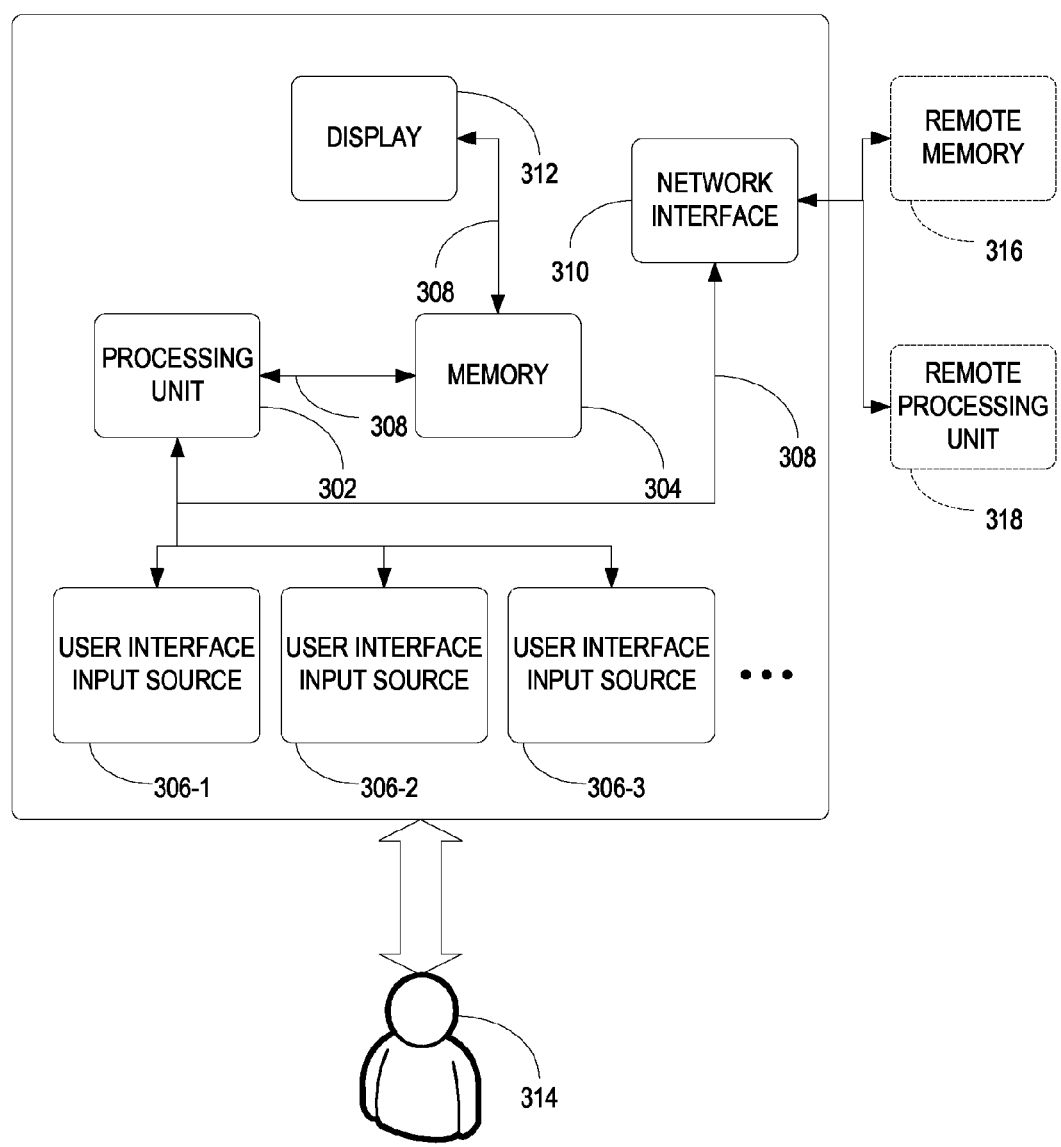
FIG. 3 is a diagram illustrating an exemplary computing device according to one embodiment of the invention.

Aspects of the invention may generally be implemented in a computing device as depicted in FIG. 3 and described below. For example, parts of embodiments of the invention may be executed on a server (computer) end or a client (computer) in accordance with the description above. In another example, the client end may be on a portable computing device with a wireless communication capability. In this example, portions of embodiments of the invention may be implemented on the portable computing device. In another example, the client may transmit a portion of the commands or actions to be processed by a remote processing unit and/or stored by a remote memory, which may be part of a server located remotely from the client.

FIG. 3 shows one example of a general purpose computing device in the form of a computing device 300. In one embodiment of the invention, the computing device 300 may be a computer. The computing device 300 may include one or more processors or processing units 302. For example, the processing unit 302 may be of a single core processor or a multi-core processor. In another embodiment, the processing unit 302 may be a 32-bit processor, a 64-bit processor, or other types of processor. The computing device 300 also includes a system memory (hereinafter simplified as "memory") 304. The memory 304 may include a bus 308 or internal communication system coupled to various system components including the memory 304 to the processing unit 302. There are many types of bus known in the art, such as one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The memory 304 includes at least some form of computer readable media. Computer readable media, which include both volatile and nonvolatile media, removable and non-removable media, may be any available medium that may be accessed by computing device 300. By way of example and not limitation, computer readable media include computer storage media. Computer storage media include volatile and nonvolatile, removable and non-removable media for storage of information such as computer readable instructions, data structures, program modules, or other data. For example, computer storage media include RAM, ROM, EEPROM, flash memory or other memory technology, optical disk storage (such as CD, DVD, or Blue-ray), magnetic cassettes, magnetic tape, magnetic disk storage, or any other tangible medium that may be used to store the desired information. Those skilled in the art would appreciate that data stored in the computer readable medium may be transmitted via modulated data signal, encoded signal, wired media, such as a wired network or direct-wired connection, or other wireless media, such as acoustic, RF, infrared, and Bluetooth®. Combinations of any of the above are also included within the scope of computer readable media.

In another example, the memory 304 includes computer storage media in the form of removable and/or non-removable, volatile and/or nonvolatile memory storing computer-executable instructions, such as an operating system, application programs or (app in certain mobile execution environment), other program modules, and program data. The memory 304 also stores user data, UI data, or a combination of above.

A user 314 may enter commands and information into the computing device 300 through one or more user interface input sources (hereinafter UI sources) 306. For example, a UI source 306-1 may be a touch-based user interface (such as a keyboard, a pointing device (e.g., a mouse, trackball, pen, or touch pad), or a touch screen), a UI source 306-2 may be a voice-based user interface, or a UI source 306-3 may be another user interface. For example, the UI source 306-3 may be a fingerprint scanner, a retina scanner, or a moisture analyzer. It is to be understood that other input devices (not shown) may include a joystick, game pad, satellite dish, a camera, or the like. These and other input devices are connected to the processing unit 302 through the UI source 306 that is coupled to the bus 308, but may be connected by other interface and bus structures, such as a parallel port, game port, or a Universal Serial Bus (USB).

In one embodiment, the UI source 306 may include a network interface, such as a network interface 310. For example, the network interface 310 may be a Wi-Fi chipset or a GPS chipset that provides location-based information.

The computing device 300 also includes a display 312 or other type of display device, such as a monitor, is also connected to the system bus 308 via an interface, such as a video interface. In addition to the display 312, computers often include other peripheral output devices (not shown) such as a printer and speakers, which may be connected through an output peripheral interface (not shown).

The computing device 300 may operate in a networked environment using logical connections to one or more remote computers or devices, such as a remote memory 316 or a remote processing unit 318. The remote memory 316 and/or the remote processing unit 318 may be housed in one unit as a remote computer (such as a personal computer, a server, a router, a network PC, a peer device or other common network node, and typically includes many or all of the elements described above relative to computing device 300). In another embodiment, the remote memory 316 or the remote processing unit 318 may be located at different locations remote from the computing device 300. For the example, the remote memory 316 may be a cloud storage space for storing frequently used commands or actions or characteristics of user commands or actions. The remote processing unit 318 may be a cloud-based processor or processing unit for assisting the processing of data transmitted from the computing device 300.

The network interface 310 includes a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

When used in a local area networking environment, computing device 300 is connected to the LAN through the network interface 310. When used in a wide area networking environment, computing device 300 typically includes a modem or other means for establishing communications over the WAN, such as the Internet. The modem (not shown), which may be internal or external, is connected to the system bus 308 via the UI source 306, or other appropriate mechanism. In a networked environment, program modules depicted relative to computing device 300, or portions thereof, may be stored in a remote memory storage device (such as the remote memory 316).

For purposes of illustration, programs and other executable program components, such as the operating system, are illustrated herein as discrete blocks. It is recognized, however, that such programs and components reside at various times in different storage components of the computer, and are executed by the data processor(s) of the computer.

Embodiments of the invention may be described in the general context of computer-executable instructions, such as program modules, executed by one or more computers or other devices. Program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network, such as the remote memory 316 and the remote processing unit 318. As such, the processing unit 302 and the remote processing unit 318 may be in combination processing or executing the combined action. In another embodiment, the remote processing unit 318 may act as a backup to the processing unit 302 for processing the combined action. In a distributed computing environment, program modules may be located in both local (memory 304) and remote (memory 316) storages.

Generally, the data processors of computing device 300 are programmed by means of instructions stored at different times in the various computer-readable storage media of the computer. Programs and operating systems are typically distributed, and from there, they are installed or loaded into the memory 304 of the computing device 300. At execution, they are loaded at least partially into the computer's primary electronic memory.

The UI sources described herein may all be part of a single interface or may be implemented as separate interfaces or any combination therein. The interfaces may execute locally or remotely to provide functionality. Further, the interfaces may include additional or less functionality than illustrated or described herein.

Figure 4:
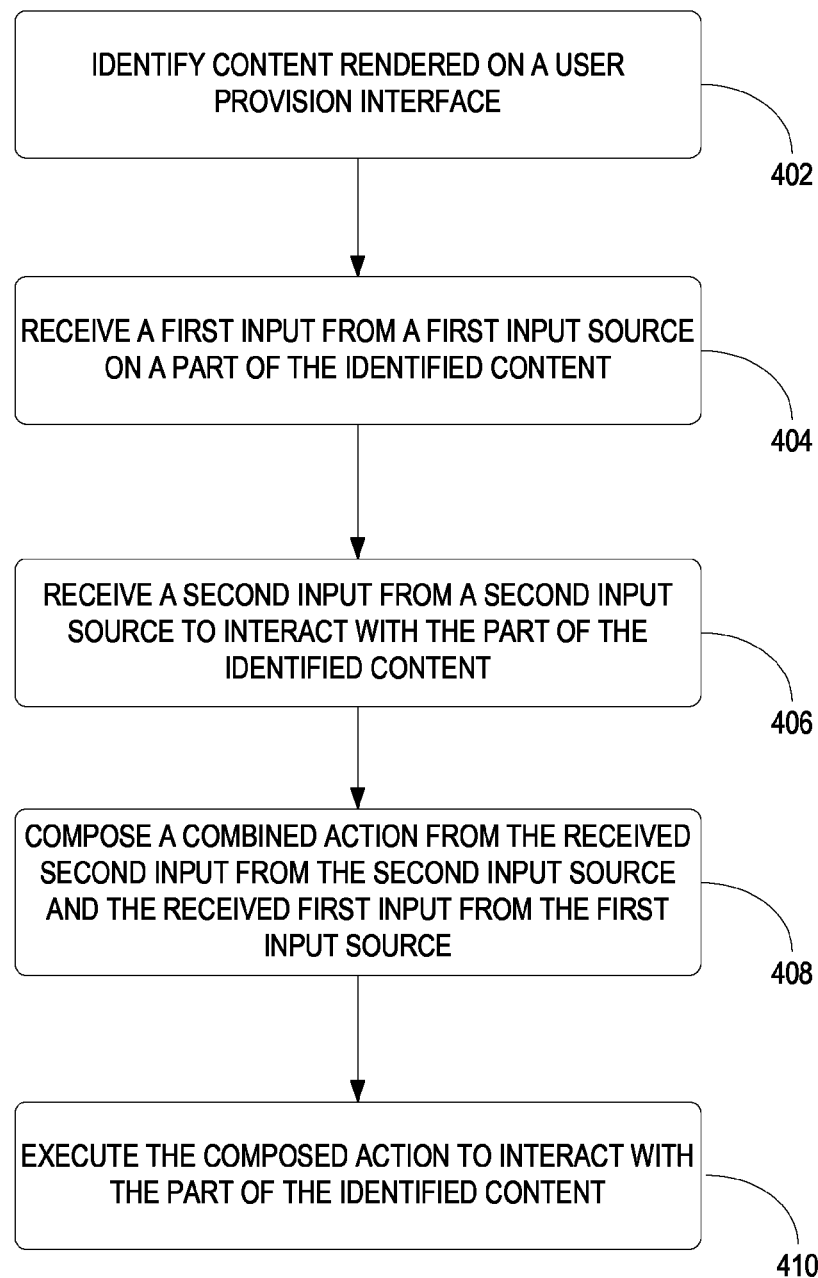
FIG. 4 is a flow diagram illustrating composing a complete action from two or more user input sources according to one embodiment of the invention.

Referring to FIG. 4, a flow diagram illustrating composition of a combined action or command from two or more input sources according to one embodiment of the invention. In one example, at 402, a content rendered on a content provisioning interface is identified. At 404, a first input from a first input source is received on a part of the identified content. In one embodiment, a command or commands associated with the first input is received. In addition, a location of the received first input is also received. At 406, a second input from a second input source is also received to interact with the part of the identified content. The second input source is different from the first input source. At 408, a combined action is composed from the received second input and the received first input from the first input source. The composed action is executed to interact with the part of the identified content at 410.

Figure 5:
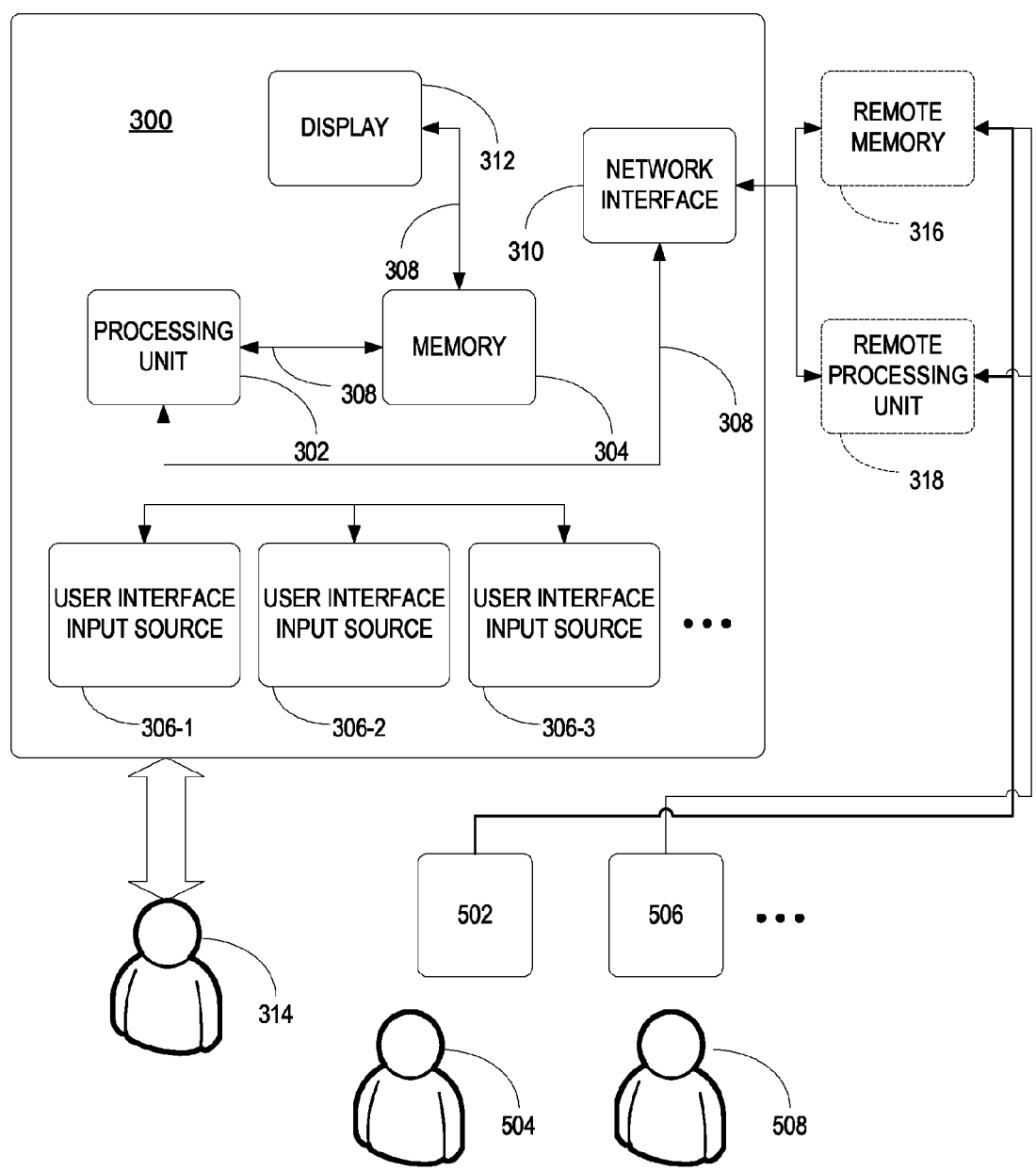
FIG. 5 is a diagram illustrating a system for composing actions from two or more input sources according to one embodiment of the invention.

It is further observed that based on above descriptions of FIG. 3, aspects of the invention may also be incorporated in a system 500 for composing actions from two or more input sources, such as the one shown in FIG. 5, which is a diagram illustrating a system for composing actions from two or more input sources according to one embodiment of the invention. For example, the system 500 includes a client device, such as the computing device 300, having a processing unit configured for processing computer-executable instructions, a content provisioning interface, a first user interface input source, a second user interface input source, a network interface, and a memory. In addition, the system 500 also includes a second client device 502 with a corresponding user 504 and a third client device 506 with a corresponding user 508. The second client device 502 and the third client device 506 are similar to the computing device 300 in terms of the hardware specification therein. As such, variations in hardware specifications of the client devices may vary. It is to be understood that additional clients may be added without departing from the scope and spirit of the invention.

Referring to FIG. 5, each of the client device (300, 502 and 506) is configured to have its processing unit identifying content rendered on the content provisioning interface of the device. The first user interface input source of each of the devices receives a first input from a user on a part of the identified content. The second user interface input source of each device receives a second input from the user to interact with the part of the identified content. The second user interface input source is different from the first user interface input source. Moreover, similar to the discussions above, additional user interface input sources may be added, either through an upgrade or an add-on, without departing from the scope and spirit of the invention.

As depicted in FIG. 5, the remote memory 316 stores data associated with the first input and/or the second input via the network interface 310 of each device (300, 502, and 506). For example, the network interface 310 transmits the data associated with the first input and/or the second input to the remote memory 316 for current execution or post execution purposes. For example, the remote memory 316 may store the data association with the first input and/or the second input while the client device (300, 502 or 506) waits for additional inputs in the current execution purpose/mode. In the post execution purpose/mode, the remote memory 316 stores the first input and/or the second input to study or analyze the user's interaction habits, such that the user may receive rich interaction sets or a pre-packaged but yet personalized complete command such that the user (114, 504 or 508) does not need to wait for the timed out.

The processing unit of the client device in the system 500 composes a combined action from the received second input from the second input source and the received first input from the first input source. The processing unit of each device executes the composed action for the user to interact with the part of the identified content. In one embodiment, the remote memory 116 stores data of the combined action. In an alternative embodiment, the remote processing unit 118 shares processing or execution workload with the processing unit 102. For example, suppose the first input is a touch input on a web page that the remote processing unit 118 provisioned to the client device 300. The remote processing unit 118 in waiting for interactions from the user 114 with the web page, the remote processing unit 118 has already assigns a storage, such as the remote memory 116, to store certain interactions, such as the location data, time date, as well as other metadata associated therewith. As such, the remote processing unit 118 may initiate the composition of a potential command at the remote processing unit 118 and later transmits the potential command to the processing unit 102 via its own network interface (not shown). As such, this distributed processing is more efficient and provides enhanced user experience to the user (114, 504 or 508).

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:
1. A computerized method for composing actions from two or more input sources comprising:
  identifying content rendering on a user interface;
  receiving a touch input on a part of the identified content, said touch input corresponding to a first executable action, said part of the identified content comprises an object for the first executable action;

9 in response to receiving the touch input, initiating a first state counter;
receiving another input from another source to interact with the part of the identified content, said the another source being different from the touch input, said another input corresponding to a second executable action, wherein the part of the identified content also comprises an object of the second executable action;
in the event that receiving the another input is within an expiration of the first state counter, composing a combined action from the received another input and the received touch input, said combined action comprising a dynamic set of actions in response to structuring the objects of the first executable action and the second executable action;
executing the composed action to interact with the part of the identified content; and
in the event that the first state counter expires before receiving the another input, executing the touch input with the part of the identified content.

2. The computerized method of claim 1, wherein receiving the another input comprises receiving a voice command.

3. The computerized method of claim 1, initiating the first state counter comprises setting a predetermined period between receiving the another input and composing the combined action.

4. The computerized method of claim 1, wherein receiving the touch input comprises receiving a location data of the touch input with respect to the part of the identified content.

5. The computerized method of claim 1, wherein composing comprises composing the combined action with the received touch input being a first portion of the combined action and with the received another input being a second portion of the combined action.

6. The computerized method of claim 1, further comprising setting a predetermined period between receiving the touch input and composing the combined action.

7. The computerized method of claim 1, further comprising continuously monitoring for additional inputs from input sources between receiving the another input and the composing, and further comprising setting another predetermined period between receiving each of the additional inputs and the composing.

8. A computerized method for composing actions from two or more input sources comprising:
identifying content rendered on a content provisioning interface, said content provisioning interface comprises a user interface;
receiving a first input from a first input source on a part of the identified content at a first state, said first input corresponding to a first executable action, said part of the identified content comprises an object for the first executable action;
in response to receiving the first input, initiating a first state counter;
receiving a second input from a second input source to interact with the part of the identified content, said the second input source being different from the first input source, said second input corresponding to a second executable action, wherein the part of the identified content also comprises an object of the second executable action; and
in the event that the second input is received before the first state counter expires, composing a combined action from the received second input from the second input source and the received first input from the first input source, said combined action comprising a dynamic set

10 of actions in response to structuring the objects of the first executable action and the second executable action, wherein the composed action is executed to interact with the part of the identified content.

9. The computerized method of claim 8, wherein receiving the first input comprises receiving a touch-based input on a touch sensitive display.

10. The computerized method of claim 8, wherein receiving the second input comprises receiving a voice command.

11. The computerized method of claim 8, initiating the first state counter comprises setting a predetermined period between receiving the second input and composing the combined action.

12. The computerized method of claim 8, wherein composing comprises composing the combined action by concatenating the received first input and the received second input according to an order when the first input and the second input are received.

13. The computerized method of claim 8, further comprising setting a predetermined period between receiving the first input and composing the combined action.

14. The computerized method of claim 8, further comprising continuously monitoring for additional inputs from input sources between receiving the second input and the composing.

15. A system for composing actions from two or more input sources comprising:
a client device having a processing unit configured for processing computer-executable instructions, a content provisioning interface, a first user interface input source, a second user interface input source, a network interface, and a memory, said content provisioning interface comprises a display;
said processing unit identifying content rendered on the content provisioning interface;
said first user interface input source receiving a first input from a user on a part of the identified content, said first input corresponding to a first executable action, said part of the identified content comprises an object for the first executable action;
said processing unit initiating a state counter in response to the first user interface input source receiving the first input;
said second user interface input source receiving a second input from the user to interact with the part of the identified content, said the second user interface input source being different from the first user interface input source, said second input corresponding to a second executable action, wherein the part of the identified content also comprises an object of the second executable action;
a remote memory for storing data associated with at least one of the following transmitted via the network interface: the first input and the second input;
wherein, in the event that the second user interface input source receives the second input before the state counter expires, the processing unit composes a combined action from the received second input from the second input source and the received first input from the first input source, said combined action comprising a dynamic set of actions in response to structuring the objects of the first executable action and the second executable action, wherein the processing unit executes the composed action for the user to interact with the part of the identified content.

16. The system of claim 15, wherein the network interface transmits the combined action to the remote memory.

17. The system of claim 15, further comprising a remote processing unit, wherein the network interface transmits the first input or the second input to the remote processing unit.

18. The system of claim 17, wherein the processing unit and the remote processing unit in combination compose the combined action.

19. The system of claim 15, wherein the client device further comprising additional user interface input sources, wherein the processing unit is further configured to continuously monitor for additional inputs from the additional user interface input sources.

20. The system of claim 15, wherein the processing unit is configured to set a predetermined period before composing the combined action in response to either the first user interface input source receives the first input or the second user interface input source receives the second input.

* * * * *